Patented Feb. 4, 1930

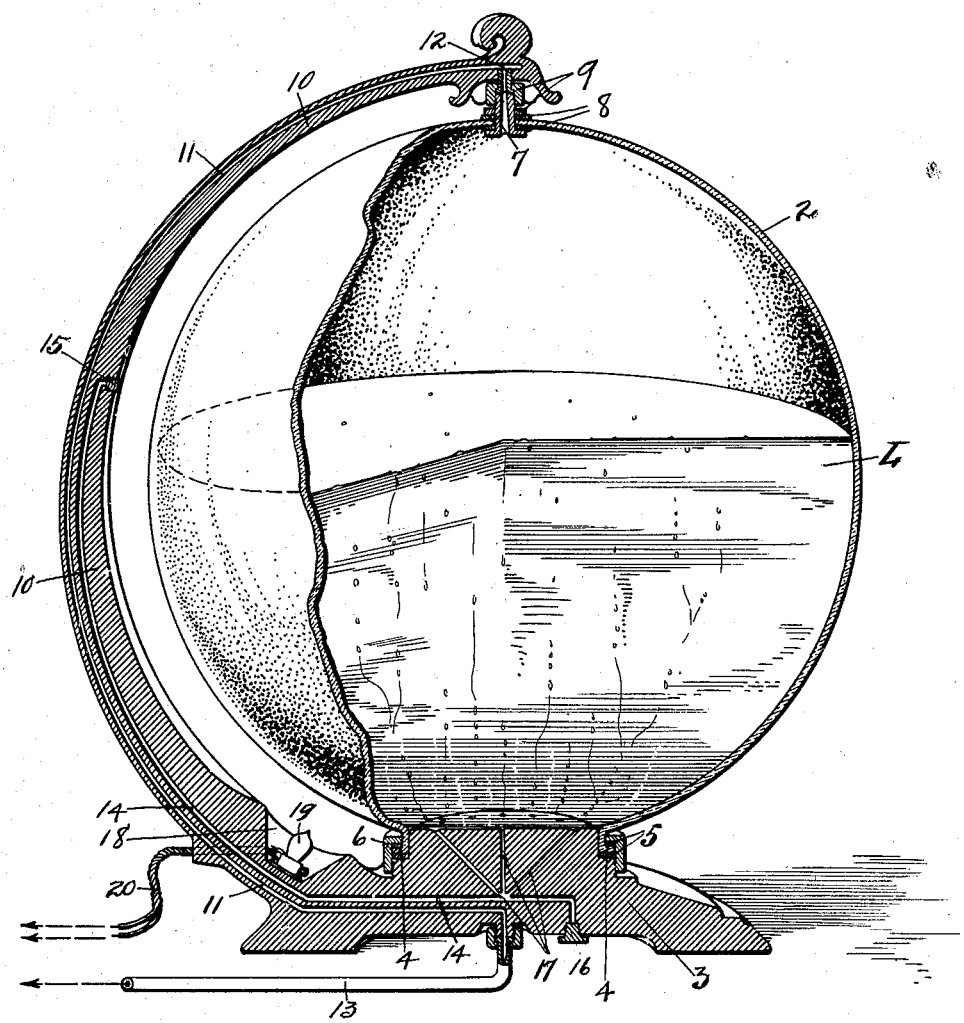

1,745,649

UNITED STATES PATENT OFFICE

FORREST G. STANFORD, OF LOS ANGELES, AND HERBERT L. GLAZE, OF SOUTH PASADENA, CALIFORNIA, ASSIGNORS TO THE HYLAND STANFORD COMPANY, INC., OF LOS ANGELES, CALIFORNIA

ADVERTISING DEVICE

Application filed May 1, 1928. Serial No. 274,194.

Our invention relates to advertising devices, and more particularly to a device useful as a window advertising attraction, or as a display feature in connection with a counter where soft drinks are dispensed, and in fact in any place where it will, because of its action, attract the attention of people.

Our invention consists in a glass globe or container having means connected therewith for creating therein a vacuum tendency, with provision for the admission of something visible which is caused to rush into said container in response to the vacuum tendency created therein, thus causing an action which attracts attention of people. Provision is also made whereby the matter which is admitted to said container is carried out through the vacuum creating means.

In order to explain our invention, we have shown on the accompanying sheet of drawings, a glass globe, partially filled with a liquid, with means connected to the top thereof for creating a vacuum condition therein, and with means at the bottom thereof for admitting air, whereby as air is pumped out from the top of said globe, air rushes into the bottom thereof and bubbles up through the liquid therein and into the upper part of the globe.

We have shown the device provided with means for illuminating it, an electric lamp being positioned in an out-of-sight location when said device is viewed from the front thereof, which is from the right hand side of the figure shown in the drawings, but which illuminates the globe and the contents thereof and produces an attractive apparatus for any display purpose.

Figure 1 is a side elevation of a device which embodies our invention, partly in section and broken away, to show the construction and arrangement.

The embodiment of our invention shown for illustrative purposes only, comprises a glass globe 2, connected with a base 3, by means of a flange 4, with packing means 5, and a binding ring 6, screwed onto said base 3, substantially in the manner illustrated, thus forming a tight joint between the globe 2 and the base 3.

The top of said globe 2, is connected by means of a spool or bushing 7, with packing 8, and lock nuts 9, to an arm 10, having a conduit 11 therethrough, connecting at its upper end, as at 12, through said element 7, with the interior of said globe, and at its lower or other end with a pipe 13, leading to a vacuum pump, or other vacuum creating means. Said pipe 13, is connected through the bottom of the base 3, substantially as indicated, whereby the conduit 11, in the arm 10, and the connection to the vacuum creating means is obscured from view of the public.

In said base is a conduit 14, extending upwardly in the arm 10, to a point slightly above the liquid level, as at 15, at which it opens to the atmosphere out through said arm. At its opposite end, said conduit 14, is provided with a closure screw plug 16, in the bottom of the base 3. Three branch conduits, designated 17, connect said conduit 14, through the base 3, with the interior of the globe 2.

Mounted in the base 3, in a recess 18, formed to receive it, is an electric lamp 19, with wire connections 20, running to any source of supply for electric energy. Plug 16 can be transferred to socket 15, and air can be forced through 17.

The operation of the device here shown for explanatory purposes may be briefly described as follows. Any suitable liquid L can be placed within the blobe, and it can be of any color or consistency. The pipe 13, connected with a vacuum pump, or other vacuum creating means, in operation, draws the air from the top part of said globe 2, out through the member 7, which is of tapering form with its mouth opening inwardly into said globe. As air is thus drawn from the top of the globe 2, air rushes in through the opening at 15, in the arm 10, and through the conduit 14, and the branch conduits 17, into the bottom of the globe and up through the liquid L, in the form of bubbles. Thus as long as the vacuum condition is created within the upper part of said globe or container 2, air will rush thereinto through the base conduits 17. It will be understood, of course, that various changes can be made in the device as here shown and described and still be within the scope of the claims forming a part of this specification, and it is not our intention to limit the invention to any particular liquid, or to any liquid necessarily, within the globe, or to the circulation of air upwardly through said globe or container, but to anything which can be passed through the inlets at the bottom of the globe and which is light enough to be drawn by the vacuum action to and through the mouth of the member 7, and thus to move upwardly through said globe as an attracting feature for advertising purposes.

What we claim and desire to cover by Letters Patent is:

1. An advertising device which includes a transparent display container, means connected at the top thereof for creating a vacuum condition therein, inlet means through the bottom of said container, said means being adapted to admit to said container matter light enough to respond to said vacuum creating action, whereby it moves through said container by the suction applied thereto.

2. An advertising device which includes a transparent display container, means connected at the top thereof for creating a vacuum condition therein, said container being adapted to hold a liquid, inlet means through the bottom of said container, said means being adapted to admit to said container matter lighter than liquid, whereby said matter passes up through said container and responds to said vacuum action and passes out through the connection of said vacuum creating means.

3. An advertising device which includes in combination, a glass container, means connected with the top thereof for creating a vaccum condition therein, said container being adapted to be partially filled with a liquid, inlet means through the bottom of said container, said inlet being connected with means outside said container extending above a normal liquid level, whereby air can enter said container through its bottom, and means for illuminating said container for advertising purposes.

4. Means for advertising which includes a glass container adapted to be partially filled with a liquid, means connected with the upper part of said container for creating a suction through said container, means connected through the bottom of said container for admitting air in response to the suction applied to said container, said air inlet having an outside extension above a normal liquid level in said container, and means for illuminating said container for advertising purposes.

5. Means for attracting attention as an advertising medium which includes a glass container partially filled with liquid, means for applying suction to the upper part of said container, means for admitting air to the lower part of said container to pass upwardly through said liquid, whereby said air passes in the form of bubbles therethrough and out in response to said suction, and means for illuminating said device from an obscured part of said apparatus.

Signed at Los Angeles, Los Angeles County, California, this 21st day of April, 1928.

FORREST G. STANFORD.
HERBERT L. GLAZE.